Figure 1:
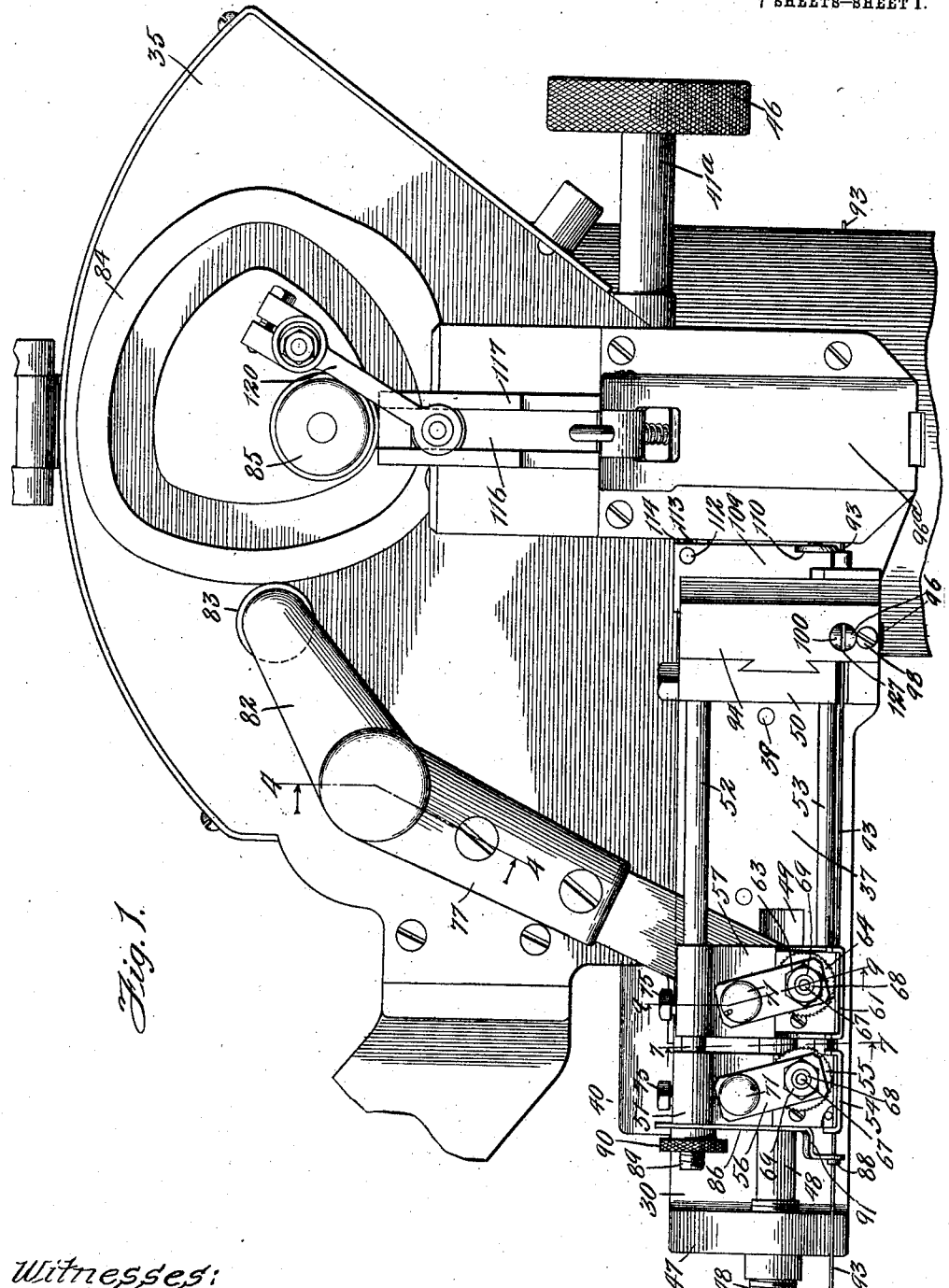

H. H. LATHAM & W. OSTERHOLM.
WIRE STITCHING MACHINE.
APPLICATION FILED JUNE 5, 1907.

980,647.

Patented Jan. 3, 1911.

7 SHEETS—SHEET 1.

Witnesses:

Inventors
H. H. Latham
Wm. Osterholm
by Brown Hopkins Atty

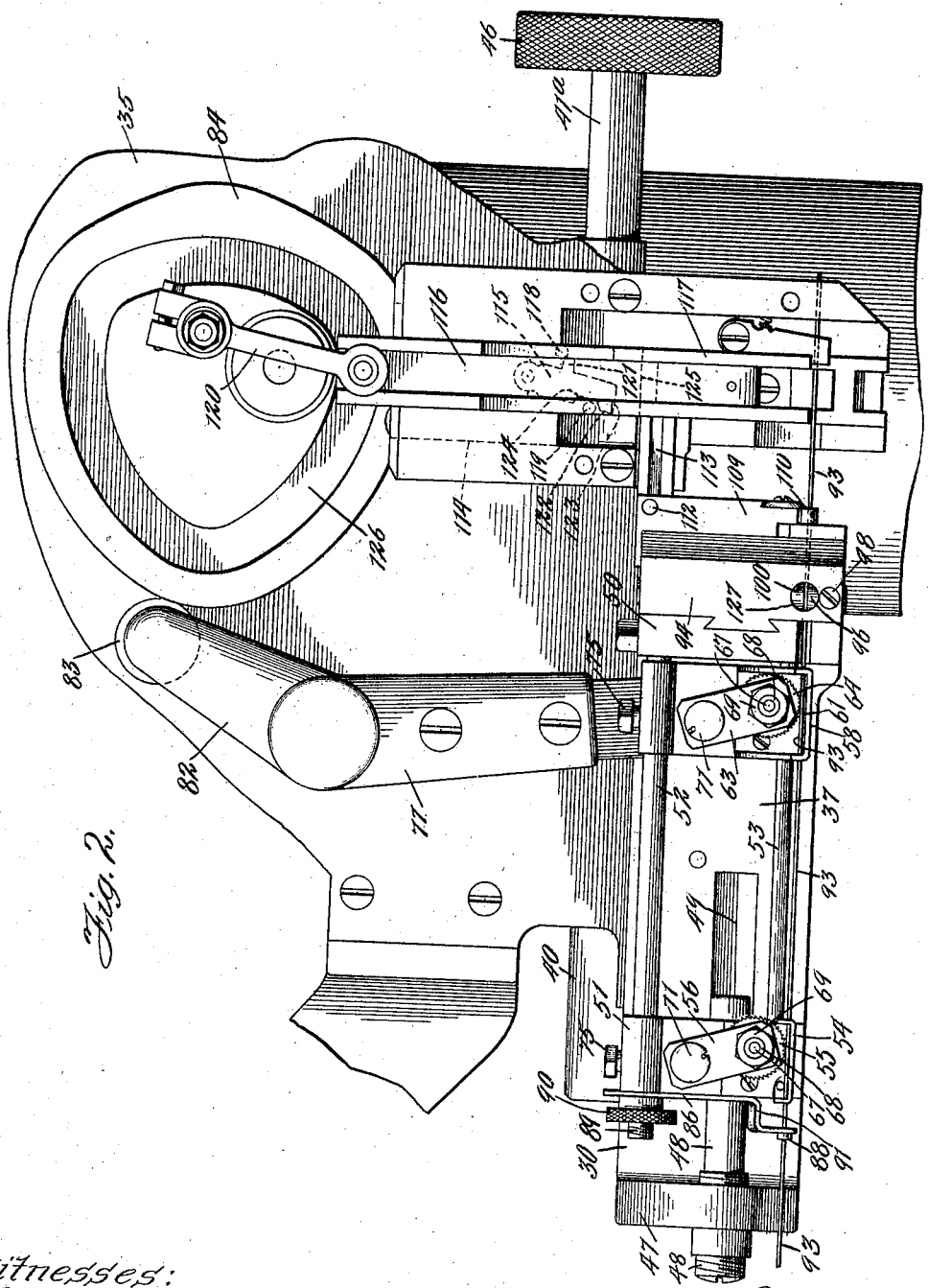

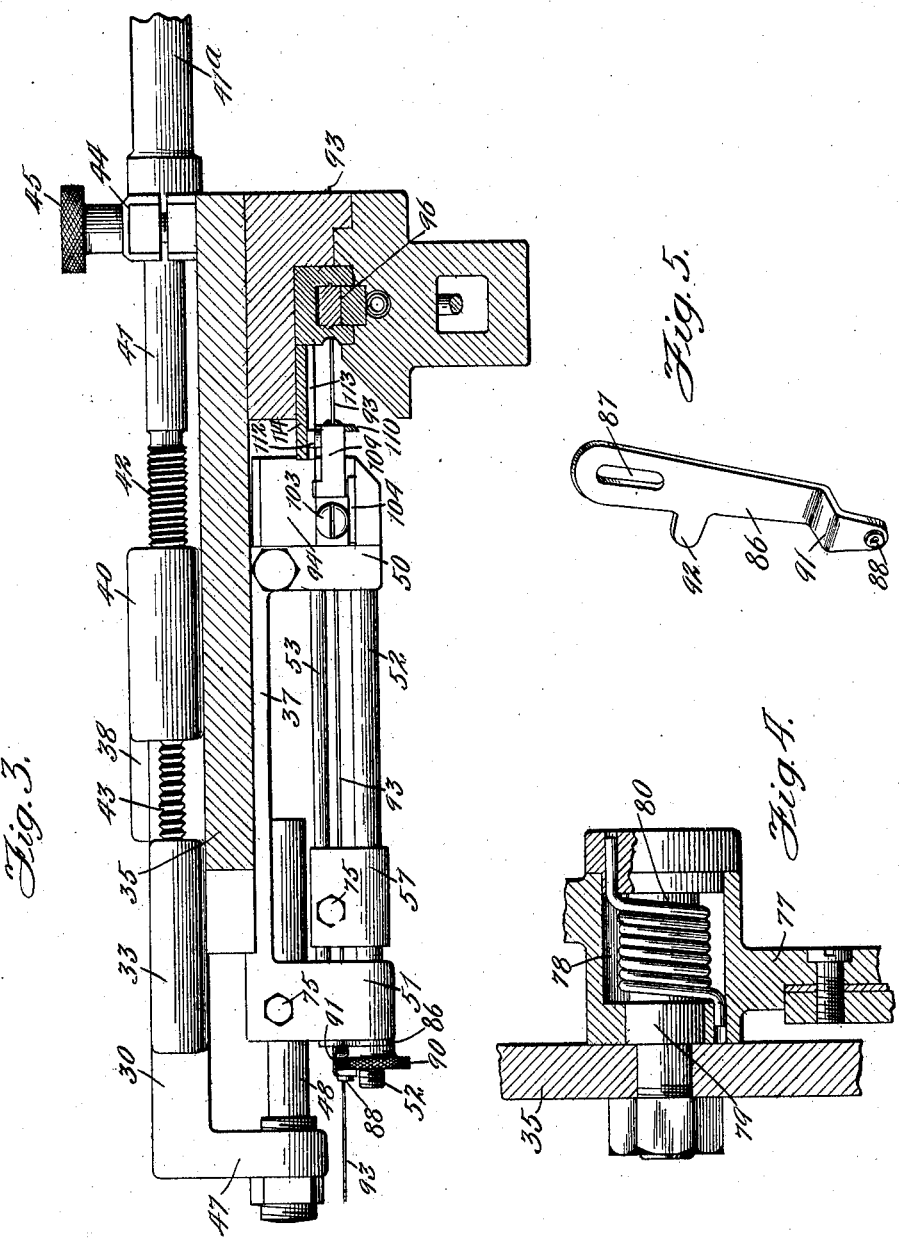

H. H. LATHAM & W. OSTERHOLM.
WIRE STITCHING MACHINE.
APPLICATION FILED JUNE 5, 1907.
980,647.
Patented Jan. 3, 1911.
7 SHEETS—SHEET 4.
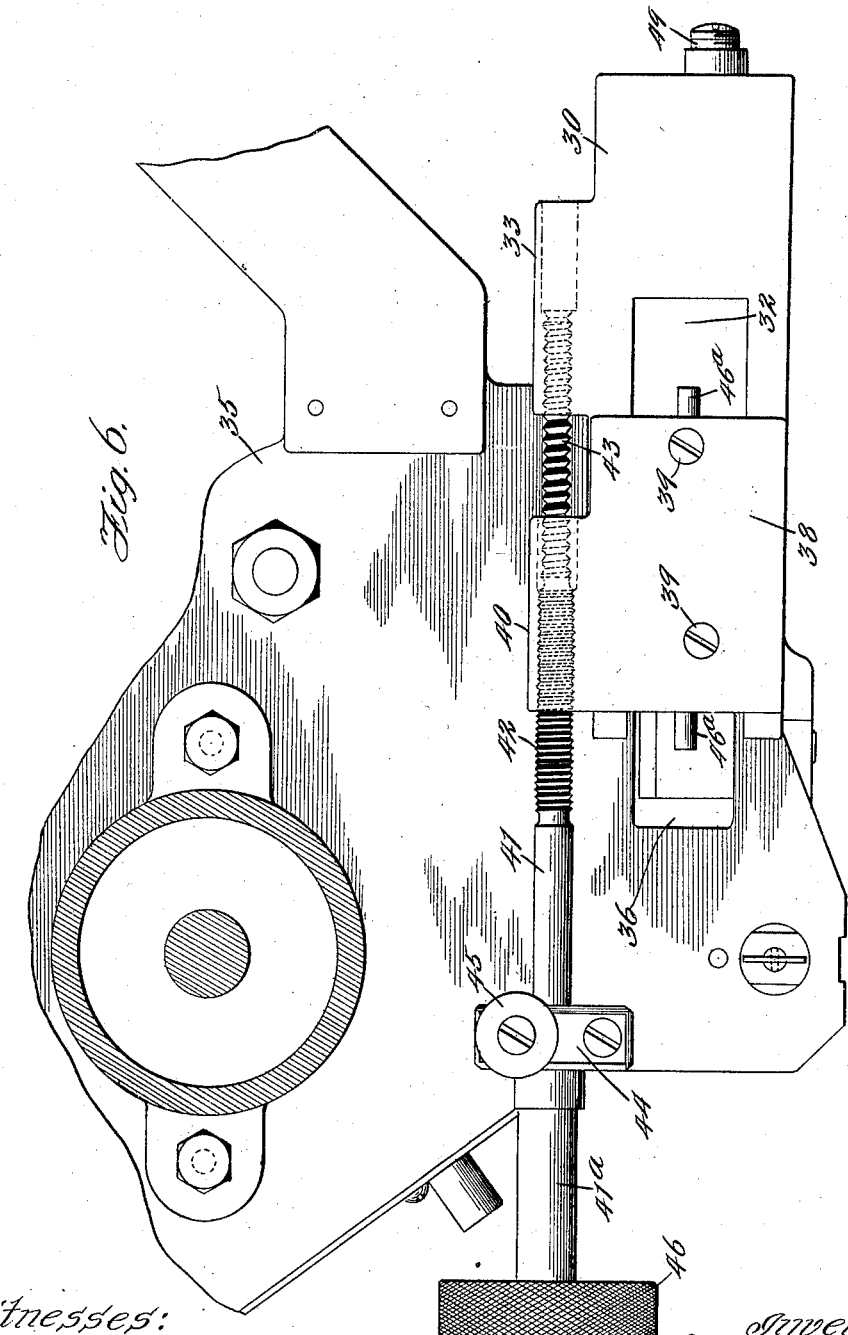

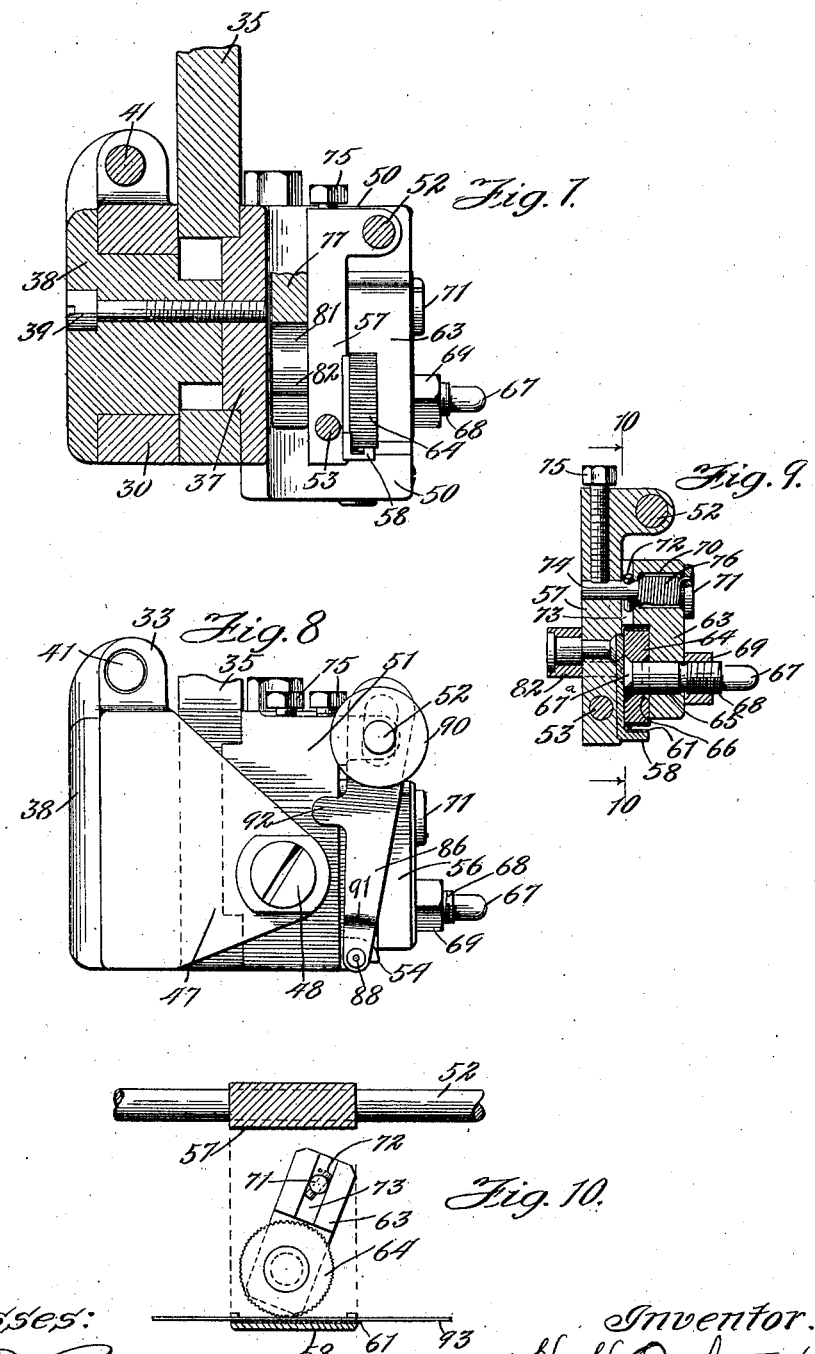

H. H. LATHAM & W. OSTERHOLM.
WIRE STITCHING MACHINE.
APPLICATION FILED JUNE 5, 1907.
980,647.
Patented Jan. 3, 1911.
7 SHEETS—SHEET 6.
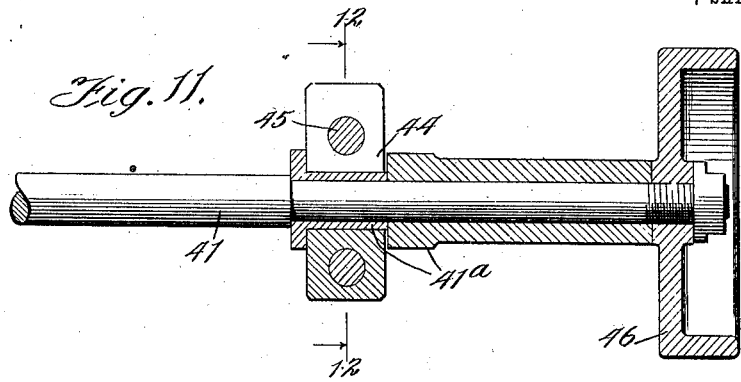
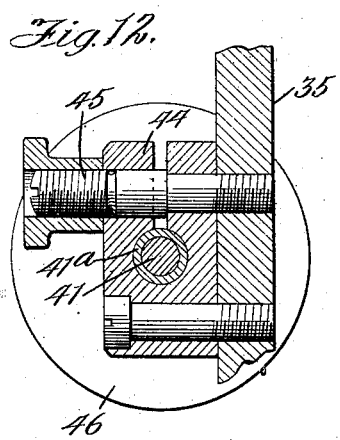
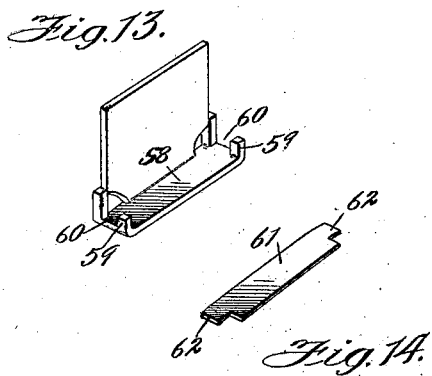
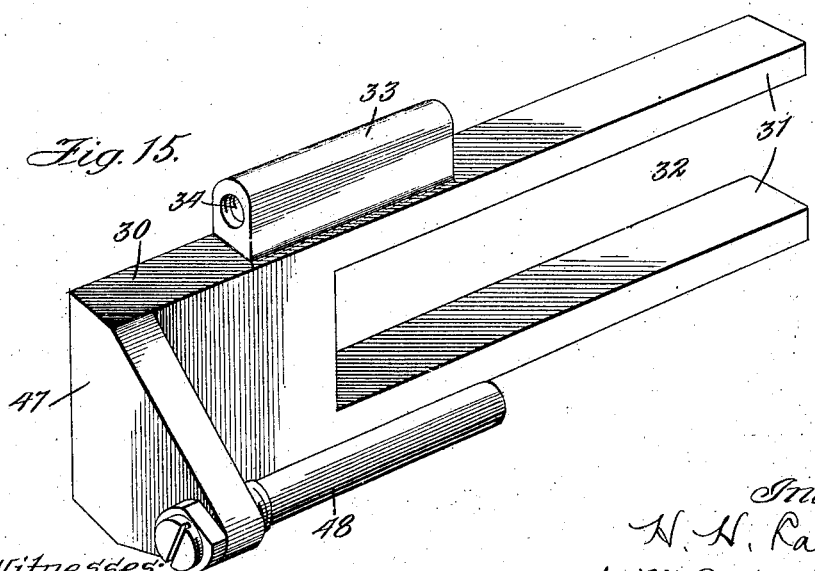

H. H. LATHAM & W. OSTERHOLM.
WIRE STITCHING MACHINE.
APPLICATION FILED JUNE 5, 1907
980,647.
Patented Jan. 3, 1911.
7 SHEETS—SHEET 7.
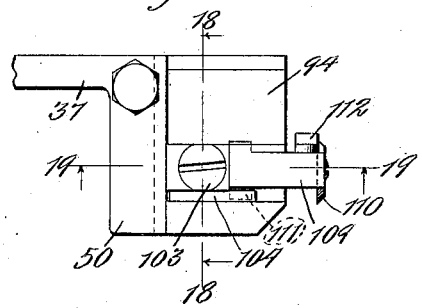
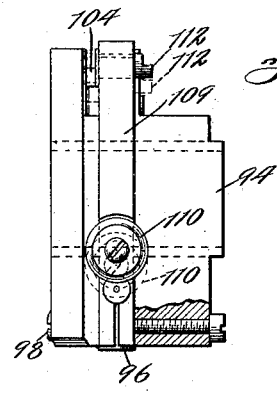
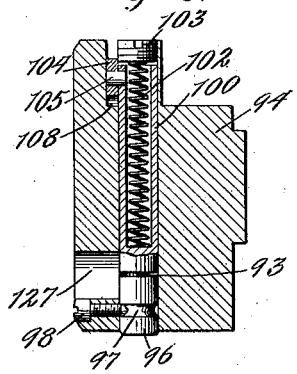
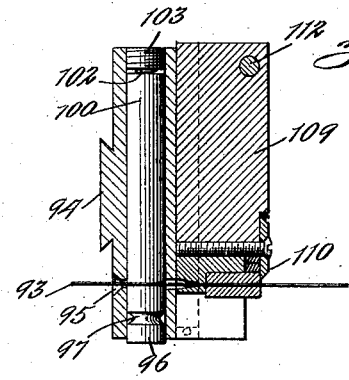
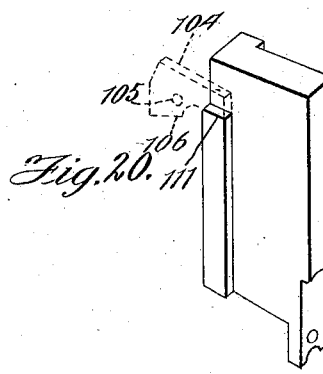
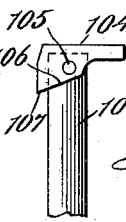
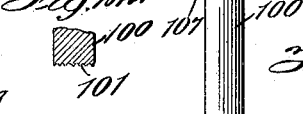

UNITED STATES PATENT OFFICE.

HARRY H. LATHAM AND WILLIAM OSTERHOLM, OF CHICAGO, ILLINOIS, ASSIGNORS TO LATHAM MACHINERY COMPANY, OF CHICAGO, ILLINOIS, A CORPORATION OF ILLINOIS.

WIRE-STITCHING MACHINE.

980,647.          Specification of Letters Patent.          Patented Jan. 3, 1911.

Application filed June 5, 1907. Serial No. 377,453.

*To all whom it may concern:*

Be it known that we, HARRY H. LATHAM and WILLIAM OSTERHOLM, citizens of the United States, residing at Chicago, in the county of Cook and State of Illinois, have invented certain new and useful Improvements in Wire-Stitching Machines, of which the following is a specification.

This invention relates to improvements in wire stitching machines, and more particularly to that type of machine in which the wire is intermittently fed into the machine and cut off into suitable lengths, formed into staples and driven through the paper which it is desired to stitch and clenched on the other side. In machines of this character the supply wire is generally fed from a spool or reel, and consequently the wire before it enters the machine is somewhat curved which tends to throw the end out of line with the wire guide and other mechanism.

To overcome this difficulty and objection and to provide improved means for straightening or removing the curve from the wire so that it will properly enter the machine, is one of the primary objects of this invention.

A further object is to provide improved means for feeding the wire into the machine, and improved means for adjusting the feeding mechanism for varying the size of the staples and for simultaneously forming the legs of the staples of a uniform length.

A further object is to provide an improved form of gripping mechanism for the wire.

A further object is to provide an improved machine of this character which will be simple, cheap, durable in construction and effective and efficient in operation.

To the attainment of these ends and the accomplishment of other new and useful objects as will appear, the invention consists in the features of novelty in the construction, combination and arrangement of the several parts hereinafter more fully described and claimed and shown in the accompanying drawings, illustrating an exemplification of the invention, and in which—

Figure 1 is a front elevation of a portion of a machine embodying these improvements and constructed in accordance with the principles of this invention. Fig. 2 is a view similar to Fig. 1, with a portion of the casing removed and showing the feeding mechanism in a different position. Fig. 3 is a transverse view, partly in section, of the feed adjusting mechanism. Fig. 4 is a sectional view on line 4—4 of Fig. 1. Fig. 5 is a detail perspective view of the adjustable arm or member which coöperates with one of the gripping members for removing the curve from or straightening the wire before it enters the machine. Fig. 6 is a detail rear elevation, partly in section, of the head of the machine and of the feed adjusting means. Fig. 7 is a detailed elevation partly in section on line 7—7 of Fig. 1. Fig. 8 is an end elevation of the feeding mechanism, showing the arm or member for starting the wire, in position. Fig. 9 is a detail sectional view on line 9—9 of Fig. 1. Fig. 10 is a sectional view on line 10—10 of Fig. 9. Fig. 11 is a detail sectional view of the operating handle for adjusting the feeding mechanism. Fig. 12 is a sectional view on line 12—12 of Fig. 11. Fig. 13 is a detail perspective view of one of the wire supports of the movable gripping member. Fig. 14 is a detail perspective view of the wear plate. Fig. 15 is a detail perspective view of one of the supporting members or plates. Fig. 16 is a plan view of the removable head and cutter. Fig. 17 is a right-hand end elevation of Fig. 16. Fig. 18 is a sectional view on line 18—18 of Fig. 16. Fig. 19 is a sectional view on line 19—19 of Fig. 16. Fig. 20 is a detail perspective view of the movable support for the cutter and the operating member for the movable wire gripper or plunger supported by the removable head. Fig. 21 is a detail elevation showing the operating dog for the gripper or plunger. Fig. 22 is a longitudinal sectional view of the gripping end of the gripper or plunger. Fig. 23 is a plan view of the gripping face of the gripper or plunger.

Referring more particularly to the drawings the numeral 30 designates a plate or member, which is preferably provided with spaced arms 31 to form a bifurcated portion 32, and projecting above the upper edge of one of the arms 31 is a tubular portion 33, which is preferably provided with interior screw-threads 34. This plate or member 30 is arranged adjacent the rear face in a suitable back plate 35, so that the bifurcated portion 32 therein will register with an elongated slot 36 in the back plate. A member 37 is arranged adjacent the front face of the back plate 35, and is provided with a rearwardly projecting portion which extends through the slot 36 and into the bifurcated portion 32 of the member 30, and secured to the rear face of the projecting portion of the plate 37 is a plate 38, which is adapted to stand adjacent the rear face of the plate or member 30, and the plate 38 is secured in position to the member 37 in any desired or suitable manner, preferably by means of screws or bolts 39 which pass through the plate 38 and into the rear of the projecting portion of plate 37. The plate 38 is provided with a tubular portion 40, which is adapted to register with the tubular portion 33 of the plate 30, and said tubular portion 40 is also provided with interior screw-threads.

A suitable bar or rod 41 is provided with a threaded extremity which is divided into two sections 42, 43, the threads on the two sections being of different pitch, that is the thread on the section 42 being of a smaller pitch than the threads on the section 43. These threaded portions are adapted to engage the threads in the tubular portions 33 and 40, so that when the rod or bar 41 is rotated the threaded sections 42 and 43 will cause the members 30, 37 to move toward or away from each other according to the direction of rotation of the rod, and the pitch of the threads on the section 43 being greater than the pitch of the threads on the section 42 will cause the plate 30 to move at a greater rate of speed than the speed of the plate or member 37.

Any suitable means may be provided for supporting the rod or bar 41, such as a bearing 44, secured to the back plate 35. This bearing is preferably split, as shown more clearly in Fig. 3 of the drawing, and is provided with a set-screw 45 which passes transversely therethrough, the set-screw being for the purpose of tightening the bearing 44 upon the rod 41 upon a sleeve or collar 41ª on rod or bar 41. When it is desired to adjust the members 30, 37 with respect to each other the set-screw 45 may be loosened and the rod or bar 41 rotated by means of the handle 46. After the plates have been adjusted to the desired position the set-screw 45 may be again tightened to clamp the bar or rod against further rotation to hold the plates in their relatively adjusted position. If desired, the plate 38 may be provided with projecting members 46ª, such as fiber plugs or the like, which extend beyond the edges thereof, and are adapted to engage the ends of the bifurcated portion 32 and the slot 36 to prevent the members from jamming when they are adjusted to the limit of their movement. The plate or member 30 is preferably provided with a projecting portion 47 which extends beyond the front face thereof and also beyond the front face of the member 37; and the projection 47 is provided with a suitable aperture, in which is inserted one end of a plug 48, which latter is preferably constructed of fiber, or the like, and said plug is adapted to extend over the front face of the plate or member 37, as shown more clearly in Fig. 3 of the drawing. If desired, the plate 37 may be provided with a recessed or cutaway portion 49, into which a portion of the plug 48 is adapted to stand in order to permit the plug to be arranged closely to the face of the plate 37. The plate or member 37 is provided with a head 50 arranged adjacent to the forward end thereof, and a projection 51 arranged adjacent the rear end thereof. The head 50 and projection 51 are preferably arranged parallel with each other and project beyond the front face of the plate or member 37. Parallel rods 52, 53 are supported by the head 50 and the projection 51, one near the top and the other near the bottom and passing across the entire length of and spaced from the front of the plate 37. The lower rod 53 is preferably arranged closer to the face of the plate than the upper rod 52, as shown more clearly in Figs. 7 and 9 of the drawings. Secured to the projection 51 is a fixed wire support 54, over which is arranged a holding dog in the form of a serrated wheel 55 rotatably supported by an arm 56, which is pivotally supported by the projection 51 in such a manner that it may swing downwardly against the support 54 should the wire attempt a retrograde or backward movement, and it may freely move upwardly away from the support in the direction of the feeding movement of the wire.

A member 57 is mounted for sliding movement on the bars 52, 53 between the projection 51 and the head 50, and secured to the member 57 is a wire support 58, similar to the support 54, shown more clearly in Fig. 13 of the drawings. The support 58 is preferably provided with upwardly projecting lugs 59 spaced from the body thereof so as to form recesses or apertures 60; and 61 designates a suitable wear plate, the outer corners of which are cut away to form tongues or projections 62, shown more clearly in Fig. 14 of the drawings, and the plate 61 is adapted to be placed upon the wire support 58 so that the tongue or projection 62 will enter the aperture 60 and be held against displacement. This plate may be removed when worn by the constant gripping and releasing of the wire when being fed. An arm 63 is pivotally supported by the member 57, and a serrated wheel 64 is adjustably mounted on the arm 63 in such a position that it may swing downwardly against the wear plate 61 on the wire support 58 when the member 57 is moved toward the head 50 to draw the feeding wire and to swing upwardly away from the wear plate 61 of the support 58 when the member 57 is moved backwardly. The wire gripper or retainer formed by the pivoted arm 56 and coöperating support 54, and the arm 63 and its coöperating support 58, may be preferably of the same construction, and the specific description of one will apply equally as well to the other. The arm 63 is provided with an aperture 65 adjacent the lower end thereof, and the serrated wheel 64 is provided with a recess or countersunk portion 66 in each face thereof. A suitable bolt or axle 67 is adapted to pass through the aperture in the wheel 64, and said bolt or axle is provided with an enlarged head 67ª adapted to enter the corresponding recessed or countersunk portion 66, and the extremity of the axle or bolt 67 is adapted to project beyond the face of the arm 63. The axle or bolt is preferably provided with a screw-threaded portion 68 adapted to be engaged by a suitable nut 69 for holding the serrated wheel 64 in position and for creating a friction upon the face of the wheel and the arm 63 to hold the wheel against rotation. When the portion of the periphery of the wheel 64 becomes worn from continual use the nut 69 may be removed, and the axle or bolt 67 adjusted slightly to permit the wheel 64 to be rotated any desired extent to bring a new portion into operative position, after which the nut 69 may be again tightened to clamp the wheel in position. The arm 63 is also provided with a suitable aperture adjacent the upper end thereof, and an enlarged or countersunk portion 70. A suitable bolt or axle 71 is provided with an enlarged head, and said bolt or axle is adapted to pass through the aperture 70 and project beyond the rear face of the arm 63, as shown more clearly in Fig. 9 of the drawings. A pin 72 passes transversely through the bolt or axle 71 adjacent the rear face of the arm 63 to hold the bolt or axle against displacement, and said pin 72 is located within a suitable groove or channel 73, as shown more clearly in Figs. 9 and 10 of the drawing, and serves to limit the pivotal movement of the arm 63 by means of the extremities of the pin 72 engaging the walls of the groove or aperture 73. The extremity 74 of the bolt or axle 71 projects beyond the rear face of the arm 63 and is adapted to enter a suitable aperture on the member 57, and said bolt or axle is held against displacement in any desired or suitable manner, preferably by means of a screw or bolt 75 passing through the member 57 and engaging the extremity 74 of the bolt 71 for clamping the latter against displacement. When in this position, the arm 63 will be supported for a limited pivotal movement upon the bolt or axle 71. Any suitable means may be provided for normally holding the wheel 64 in engagement with the support 58. A suitable and efficient means for accomplishing this purpose comprises a spring 76, which surrounds the bolt or axle 71 within the aperture or recessed portion 70, and one end of said spring is preferably secured to the bolt or axle 71 and the other to the arm 63.

Any suitable means may be provided for reciprocating the member 57 on the rods 52, 53 and between the head 50 and the projection 51. A suitable and efficient means for accomplishing this purpose comprises a lever 77, which is provided with a tubular portion 78 intermediate its ends, as shown more clearly in Fig. 4 of the drawing. This lever 77 is pivotally supported to the back plate 35 by means of a suitable axle 79, passing through the tubular portion 78, and surrounding the axle 79 is a suitable coiled spring 80, one end of which is secured to the axle 79 and the other end is secured to a portion of the lever 77. The lower end of the lever 77 is preferably bifurcated, as at 81, shown more clearly in Fig. 7 of the drawing, and projecting from the rear face of the member 57 is an anti-friction wheel 82, which is adapted to stand within the bifurcated portion 81 of the lever 77. The upper end 82 of the lever 77 is preferably disposed at an angle to the body portion 77, and journaled upon the free extremity thereof is an anti-friction roller 83. A suitable cam 84 is rotatably mounted upon the back plate 35 and in such a position as to engage the anti-friction roller 83 on the lever 77, so that when the cam 84 is rotated by means of the shaft 85 which derives its motion from any suitable source of power, a periphery of the cam 84 will rock the lever 77, the spring 80 tending to hold the antifriction roller 83 in engagement with the cam 84, so that when the cam is rotated a reciprocating movement will be imparted to the member 57 through the medium of the lever 77 and the spring 80.

As the member 57 is reciprocated back and forth the wire will be fed from the reel or spool to the staple-forming mechanism, and as the wire is paid out from the reel it will assume a curved form and this gives it a tendency to project upwardly or in some other direction out of a straight line which would prevent its being fed into the proper guides and the staple-forming and driving mechanism. In order to remove this curvature from the wire before it comes into engagement with those parts of the machine where its deflection from a straight line would materially interfere with the proper operation of the machine, a suitable arm or member 86 is provided. This arm or member is preferably provided with a slot 87 adjacent the upper extremity thereof, and an aperture 88 adjacent the lower extremity. The end of the rod 52 is preferably arranged to extend beyond the support 51 and is provided with screw-threads 89, and this threaded extremity of the rod 52 is adapted to pass through the aperture 87 of the arm or member 86, which latter is supported by the end of the rod and is held in position by means of a suitable nut 90, engaging the threaded extremity 89 of the rod 52 for clamping the arm or member 86 against the support 51. The lower extremity of the arm or member 86 is preferably offset, as at 91, and said arm or member 86 is of such a length that the aperture 88 may be placed in a direct line with the wire support 54, and by releasing the nut 90 and adjusting the arm or member 86 in such a manner as to elevate or depress the aperture 88 with respect to the wire support 54 a friction will be exerted upon the wire as it is drawn through the aperture 88 and over the wire support 54 by the member 57 and will remove the curve or straighten the wire. The arm or member 86 may be provided with a projecting portion 92 extending from one side thereof which is adapted to engage the support 51 to brace and form a bearing for the member when the latter is rotated about the bar or rod 52 as a pivot to obtain the proper adjustment. It will also be seen that when one end of the wire 93 is passed through the aperture 88 between the serrated wheel 55 and wire support 54 and between the serrated wheel 64 and wire support 58 that this portion of the machine will be ready for operation, and as the cam 84 is rotated the lever 77 will be rocked from the position shown in Fig. 1 to the position shown in Fig. 2, and as the lever is rocked a tension will be created upon the spring 80, which tension tends to return the lever 77 to its normal position, as shown in Fig. 1. When the lever is rocked to the position shown in Fig. 2, the wire 93 will be drawn through the aperture 88 and the retainer or gripper comprising the pivoted arm 56, serrated wheel 55 and the wire support 54, until the lever has reached the limit of its forward movement. As the lever 77 moves back to its normal position the arm 63 will move about its pivot 71, until the lever has assumed the position as shown in Fig. 1, when the forward movement of the member 57 will cause the serrated wheel 64 to again grip the wire 93 and feed another supply, the wire being held against retrograde movement by the stationary retainer or gripper.

When it is desired to regulate the movement of the lever 77 to vary the length of the legs of the staple, the operating handle 46 is rotated after the set-screw 45 has been adjusted to release the rod or bar 41. The rotation of this rod or bar 41 through the medium of the handle 46 will cause the plates or members 30, 37 to be fed toward or away from each other according to the direction of rotation of the handle 46, and as the ratio of the threaded portions 42 and 43 are preferably two to one, that is the portion 42 being provided with threads 36 to the inch and the portion 43 being provided with threads 18 to the inch, the plate or member 30 will move twice the distance that the plate or member 37 moves, so that the fiber plug 48 against which the end of the lever 77 abuts will be moved twice as far as the head 50 so that the lever 77 will be permitted to move the proper distance to feed the wire 93 into the staple-forming machine a sufficient distance in relation to the movement of the cutter that when the wire is cut and the staple formed by the former both legs of the staple will be of uniform length.

Movably supported by the head 50 is a member 94, which is provided with a suitable aperture 95 arranged in a direct line with the movement of the wire 93 when the latter is being fed so that the wire will pass into the aperture 95 and through suitable registering apertures in the member 94 and into the staple-forming mechanism, the specific construction of which latter forms the subject-matter of a separate application. Arranged within the member 94 is a removable member or plug 96, which is preferably provided with a reduced circumferential portion 97, and said plug or member is removably held in position in any desired or suitable manner, preferably by means of a screw or bolt 98 passing through the member 94, with the extremity thereof seated within the circumferential groove 97. The upper face of the member 96 is preferably serrated by means of a series of concentric circular grooves or projections 99, shown more clearly in Fig. 23 of the drawing, and said plug or member 96 is so arranged that the serrated face thereof will be in a position to be engaged by the wire 93 as it passes through the member 94. A suitable plunger 100 is also arranged within the member 94, the lower extremity or face of which is also serrated as at 101, in a manner similar to the face of the plug or member 96. This plunger is arranged above the plug or member 96, and is normally held in engagement therewith by means of a suitable spring 102, the tension of which may be adjusted by a suitable plug 103, against which one end of the spring 102 rests. The plunger or member 100 is preferably hollow, as shown more clearly in Fig. 18 of the drawing, to receive the spring 102.

A suitable dog or lever 104 is provided with a laterally projecting lug 105 adapted to enter a suitable aperture in the member or plunger 100, operatively adjacent the upper end thereof, and said dog or lever is provided with an inclined face 106 to form a projecting extremity 107, which is adapted to be brought into engagement with a shoulder 108 on the member 94, when the dog or lever 104 is rocked about its point of pivotal support formed by the engagement of the lug or projection 105 with the plunger or member 100 to raise the plunger or member out of engagement with the wire 93 to permit the wire to be fed forward by the movement of the wire-gripping member.

Slidingly mounted on the member 94 is a member 109, secured to which is a suitable cutter 110, the specific construction and operation of which forms the subject matter of a separate application. The member 109 is provided with a shoulder 111, shown more clearly in Fig. 20 of the drawing, and said shoulder is arranged to engage the free extremity of the dog or pawl 104 when the member 109 is elevated so as to rock the dog or pawl and raise the gripping plunger or member 100 in the manner already set forth.

Projecting laterally from the member 109, preferably the upper corner thereof, is a lug 112 which is adapted to enter a groove 113 in a sliding member 114, which latter is movable upon the back-plate 35. Any suitable means may be provided for moving the member 114. A simple and efficient means for accomplishing this purpose comprises a dog or pawl 115, which is pivotally supported by the plunger 116 of the staple forming mechanism. The plunger 116 moves with the former 117, which latter is provided with projecting lugs 118—119, adapted to alternately engage suitable portions on the dog or pawl 115 to rock the latter about its point of pivotal support. When the plunger 116 is moved upwardly by means of the cam 84 through the medium of the connecting link 120, the projection 121 on the dog or pawl 115 will engage the lug 118 and rock the dog to the position shown in dotted lines in Fig. 2 of the drawing, so that when the plunger 116 descends, the extremity 122 of the dog or pawl will engage the shoulder 123 on the sliding member 114 and move the member 114 together with the member 109 downwardly to cause the cutter 110 to sever the wire 93. When the plunger 116 has moved downwardly a sufficient distance to cause the inclined portion 124 to engage the lug 119, the dog or pawl 115 will be moved to such a position to cause the projection 121 to engage the lug 118 on the upward movement of the plunger 116.

The member 114 may be raised by means of a suitable shoulder 125 on the former 117. As the member 114 is raised, the member 109 will also be raised and at the same time the dog or pawl 104 will be rocked on its point of pivotal support 105 to raise the plunger or gripper member 100 to permit the wire 93 to be fed forward. Motion is imparted to the former 117 by means of the cam groove 126 in which a suitable projection on the former travels.

The specific construction and operation of the former and cutter mechanism form the subject of separate applications and are fully set forth in said applications.

With this improved construction of machine it will be seen that the arms 56 and 63, together with the serrated wheels 55 and 64 may be readily removed by loosening the clamping screws 75, and that when so removed, the nuts 69 may be loosened to permit a new surface of the serrated wheels to be brought into position to engage the wire. It will be further noted that the serrated wheels may be entirely removed and reversed, thereby presenting an additional or a new surface to the wire. After the wheels have been adjusted and clamped in the proper position, the arms may be secured into position by inserting the extremity of the axle or bolt 71 into the aperture and adjusting the clamping screw 75. It will also be noted that by providing the member or plug 96 with a serrated face formed by concentric circles or grooves, it may be removed and axially rotated and then again secured in position so as to present a new surface to the wire after the active surface has become worn, from constant use. If desired, member 94 may be provided with a suitable aperture 127, by means of which the operator may readily ascertain whether the wire is being fed properly. With this improved arrangement, the members 30 and 37 may be adjusted with relation to each other, and also with respect to the staple forming mechanism by rotating the rod 41. Both of these members will then be simultaneously moved with relation to the staple forming mechanism, and the member 30 will be moved twice the distance that the member 37 is moved, that is, when the member 37 is moved to properly space the cutter 110 from the staple forming mechanism a sufficient distance to form one leg of the staple the desired size, the member 30 which carries the stop 48, against which the sliding feeder abuts will be moved twice the distance that the member 37 is moved, so as to permit the sliding member on its forward or operative movement to advance or shove the free end of the wire 93 into the staple forming mechanism a sufficient distance so that when the wire is severed by the cutter 10, the cut portion of the wire will project the same distance on each side of the mandrel, thereby adjusting the mechanism in one operation to simultaneously form the legs of a staple of a uniform length. When the member 37 is adjusted, the projecting lug 112 will slide in the groove 113 of the member 114 (shown more clearly in Figs. 2 and 3 of the drawing) to prevent the parts being moved out of operative position.

In order that the invention might be fully understood, the details of the foregoing embodiment thereof have been thus specifically described, but

What is claimed as new and desired to be secured by Letters Patent is:—

1. In combination in a wire stitching machine, a support, feeding mechanism including two members movable upon the support in the same direction and with respect to each other, means for adjusting both of the members with respect to each other, a wire gripper movably supported by one of the members, a stop on the other member for the movable gripper, and means for moving the gripper.

2. In combination in a wire stitching machine, a support, feeding mechanism including two members movable upon the support and with respect to each other in the same direction, a single means for simultaneously adjusting both of said members with respect to each other, a wire gripper movably supported by one of the members, a stop on the other member for the movable gripper and means for moving the gripper.

3. In combination in a wire stitching machine, feeding mechanism including two members movable with respect to each other in the same direction, a wire gripper movably supported by one of the members, a stop for the gripper supported by the other member, means for moving the gripper and means for simultaneously adjusting both of the members, said means being adapted to impart variable movements to the members.

4. In combination in a wire stitching machine, feeding mechanism including two members movable with respect to each other in the same direction, an operating bar provided with threaded portions having different pitches, said threaded portions having engagement respectively with the members, means for operating the bar to simultaneously adjust both of the members with respect to each other, a wire gripper movable on one of the members, a stop on the other member for the gripper, and means for moving the gripper.

5. In combination in a wire stitching machine, feeding mechanism including two members movable with respect to each other, a wire gripper movably supported by one of the members, a stop for the gripper, supported by the other member, means for moving the gripper, means for simultaneously adjusting both of the members, said means being adapted to move one of the members a greater distance than the distance the other member is moved, and locking means for securing said members in their adjusted position and against movement.

6. In combination in a wire stitching machine, feeding mechanism including two members movable with respect to each other in the same direction, an operating bar provided with threaded portions having different pitches, said threaded portions having engagement respectively with the members, a bearing for the rod, means for operating the rod to relatively adjust both of the members, locking means engaging the rod to lock the members in their adjusted position and against movement, a wire gripper movably supported by one of the members, a stop for said gripper supported by the other member, and means for moving the gripper.

7. In combination in a wire stitching machine, a staple forming mechanism, feeding mechanism including two members movable in the same direction with relation to the staple forming mechanism and with respect to each other, a cutter supported by one of the members, a wire gripper movably supported by said member, a stop for the gripper supported by the other member, a single means for adjusting the members with relation to the staple forming mechanism and with respect to each other whereby the legs of the staple may be simultaneously formed of the same length, means for operating the cutter, and means for moving the wire gripper.

8. In combination in a wire stitching machine, a staple forming mechanism, feeding mechanism including two members movable in the same direction with relation to the staple forming mechanism and with respect to each other, a cutter supported by one of the members, a wire gripper movably supported by said member, a stop for the gripper supported by the other member, a single means for adjusting the members with relation to the staple forming mechanism and with respect to each other whereby the legs of the staple may be simultaneously formed of the same length, means operatively related to the staple forming mechanism for operating the cutter, and means for moving the wire gripper.

9. In combination in a wire stitching machine, a staple forming mechanism, feeding mechanism including two members adjustable with relation to the staple forming mechanism and with respect to each other, a cutter supported by one of the members, a wire retainer also supported by the member for preventing retrograde movement of the wire, a wire gripper movably mounted on said member, a stop on the other member for the gripper, means for moving the gripper and operating the staple forming mechanism, means for operating the cutter and means controlled by the movement of the cutter for actuating the retainer to release the wire.

10. In combination in a wire stitching machine, a staple forming mechanism, feeding mechanism including two members adjustable with relation to the staple forming mechanism and with respect to each other in the same direction, a cutter supported by one of the members, a wire retainer also supported by the member for preventing retrograde movement of the wire, a wire gripper movably mounted on said member, a stop on the other member for the gripper, means for moving the gripper and operating the staple forming mechanism, an adjustable connection between the staple forming mechanism and the cutter for operating the latter in any of its adjusted positions and means controlled by the movement of the cutter for actuating the retainer to release the wire.

11. In combination in a wire stitching machine, a staple forming mechanism, feeding mechanism including two members, simultaneously adjustable with relation to the staple forming mechanism and with respect to each other, a wire gripper movably supported by one of the members, a stop on the other member for the gripper, means for moving the gripper to feed the wire to the former, means for preventing a retrograde movement of the wire, a cutter, means for operating the cutter, a retainer for the wire adjacent the cutter, and means controlled by the movement of the cutter for operating the retainer to release the wire.

12. In a wire stitching machine, the combination with wire feeding means including a support, means for drawing the wire over the support to feed the same to the machine, a wire straightener comprising a member provided with an aperture through which the wire passes, means for pivotally supporting the member adjacent the wire support and have adjustment transversely with respect to the support, and means for securing the member in its adjusted position to deflect the wire at a point adjacent the support.

13. In combination in a wire stitching machine, a wire gripper comprising a member, a wire support on the member and over which the wire is adapted to pass, an arm, an axle on which the arm is pivotally supported, one extremity of the axle projecting beyond the arm, means for removably securing the projecting extremity to the member, said arm being provided with a gripping surface, a spring surrounding the axle for yieldingly holding the gripping surface in engagement with the wire support, means for limiting the movement of the arm about the axle in either direction.

14. In combination in a wire stitching machine, a wire gripper comprising a member, a wire support on the member and over which the wire is adapted to pass, an arm, an axle on which the arm is pivotally supported, one extremity of the axle projecting beyond the arm, means for removably securing the projecting extremity to the member, said arm being provided with a gripping surface, and having a groove in the rear face thereof, a pin passing transversely through and projecting beyond the axle and located within the groove to limit the pivotal movement of the arm in one direction, and means for normally holding the gripping face in yielding engagement with the wire support.

15. In combination in a wire stitching machine, a wire gripper comprising a member, a wire support over which the wire passes, an arm, means for removably and pivotally securing the arm to the member, a gripping member, means for securing said member to the arm, said securing means including a member projecting for some distance beyond the arm, and means for limiting the pivotal movement of the arm.

16. In combination in a wire stitching machine, a wire gripper comprising a member, a wire support over which the wire passes, an arm, means for removably and pivotally securing the arm to the member, a gripping member, an axle passing through the gripping member and the arm for holding the gripping member in position, one extremity of the axle projecting for some distance beyond the opposite face of the arm, and interengaging means on the axle and arm for limiting the pivotal movement of the arm.

17. In combination in a wire stitching machine, a wire gripper comprising a member, a wire support over which the wire passes, an arm, means for removably and pivotally securing the arm to the member, a gripping member, an axle passing through the gripping member and the arm for adjustably holding the gripping member in position, one extremity of the axle projecting for some distance beyond the opposite face of the arm, and means for holding the axle against displacement and for clamping the gripping member in position.

In testimony whereof we have signed our names to this specification, in the presence of two subscribing witnesses, on this 3rd day of June, A. D. 1907.

HARRY H. LATHAM.
WM. OSTERHOLM.

Witnesses:
CHAS. H. SEEM,
FRANCIS A. HOPKINS.